Patented May 25, 1937

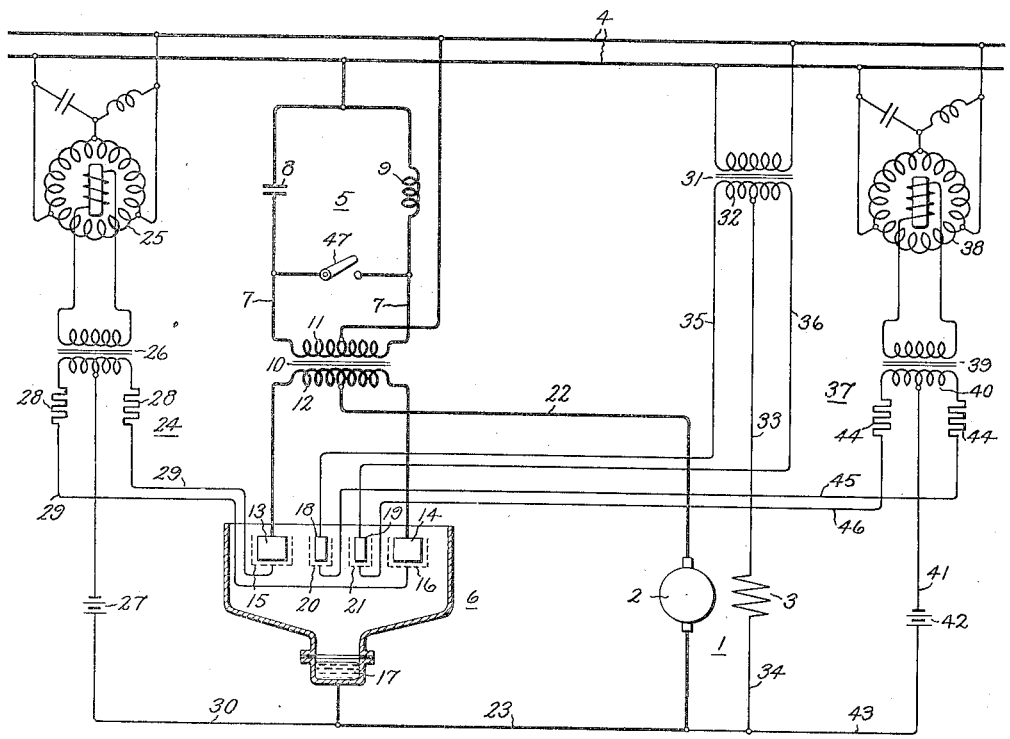

2,081,780

UNITED STATES PATENT OFFICE 2,081,780

ELECTRIC CONTROL CIRCUITS

Richard Tröger, Berlin-Zehlendorf-Mitte, Germany, assignor to General Electric Company, a corporation of New York Application May 27, 1936, Serial No. 82,017
In Germany July 29, 1935

14 Claims. (Cl. 171—312)

My invention relates to electric control circuits and more particularly to electric valve translating circuits for controlling dynamo-electric machines.

In many of the prior art arrangements, contol of dynamo-electric machines of the direct current type has been effected by energizing the machines from alternating current circuits through suitable electric valve translating apparatus. Where it has been desirable to control the dynamo-electric machines by means of the associated electric valve means, this control has been obtained at a sacrifice in the power factor conditions of the load imposed on the alternating current supply circuits. These undesirable power factor conditions in many instances have been caused by the use of controlled rectifiers in which the desired voltage control has been obtained by retarding the phase of the potentials impressed upon the control members, thereby causing the electric valve translating apparatus to consume large lagging currents from the alternating current supply circuits. It has become evident that it is highly desirable to provide electric valve translating apparatus which affords the desired flexibility of control without imposing on the alternating current circuits disproportionately low power factor loads.

It is an object of my invention to provide a new and improved control circuit.

It is another object of my invention to provide a new and improved electric valve translating circuit for controlling dynamo-electric machines.

It is a further object of my invention to provide a new and improved electric valve translating circuit for energizing a dynamo-electric machine of the direct current type from an alternating current circuit through electric valve translating apparatus, without imposing on the alternating current circuit a lagging power factor load.

In accordance with the illustrated embodiment of my invention, I provide an electric valve translating apparatus for energizing a direct current motor of the constant current type from an alternating current circuit, whereby a high degree of flexibility of operation and control is obtained and whereby the power factor of the current drawn from the alternating current circuit may be maintained in a leading relationship within the entire range of operation of the motor. A resonating network of reactances of opposite sign is energized from an alternating current circuit of constant potential and is arranged to transform constant potential alternating current to alternating current of constant value. Interposed between the network and the motor, I employ an electric valve means for converting the alternating current of constant value to direct current of constant value so that an armature winding of the motor is supplied with a substantially constant direct current. The electric valve means is of the controlled type, permitting the electric valve means to consume lagging current from the network. When a lagging current is drawn from the output circuit of a network of this type, the current supplied to the network from the constant potential alternating current circuit will be leading. In order to control the speed of the motor, an additional electric valve means is employed to control the energization of a field winding. In this way the speed and torque of the motor may be varied over the complete range of operation. An operating condition of the motor also may be controlled by controlling the output circuit of the network.

For a better understanding of my invention, reference may be had to the following description taken in connection with the accompanying drawing and its scope will be pointed out in the appended claims.

The single figure of the accompanying drawing diagrammatically represents an embodiment of my invention as applied to the control of a direct current machine of the constant current type.

Referring to the single figure of the accompanying drawing, my invention is diagrammatically shown as applied to an improved electric valve translating circuit for energizing a dynamo-electric machine of the constant current type from a constant potential aternating current circuit. A dynamo-electric machine 1 having an armature member 2 and a field winding 3 is energized from a constant potential alternating current circuit 4 through a constant potential constant current transforming means 5 and electric valve means 6. The transforming means 5 is illustrated as a resonating network and includes reactances of opposite sign connected so that a constant current is supplied to an output circuit 7 of the network. In the arrangement shown in the figure, I have chosen to represent my invention as applied to a single phase alternating current circuit and I employ a capacitive reactance 8 and an inductive reactance 9, preferably having equal values of ohmic reactances, connected so that these reactances supply a constant current to the output circuit 7 of the network. A transformer 10, having a primary winding 11 and a secondary winding 12, is employed to interconnect the network 5 and the electric valve means 6. The electric valve means 6, which comprises a plurality of arc discharge paths and which serves to convert the alternating current of constant value to direct current of constant value, is provided with main anodes 13 and 14, associated control members 15 and 16, respectively, and a cathode 17. The electric valve means 6 is also provided with auxiliary anodes 18 and 19 and associated control members 20 and 21, respectively. One terminal of the armature member 2 of the dynamo-electric machine 1 is connected to an electrical mid-connection of the secondary winding 12 of the transformer 10 through a conductor 22, and the other terminal of the armature member 2 is connected to the cathode 17 of electric valve means 6 through a conductor 23.

To control the power factor of the current supplied by the output circuit of network 5, I employ a control circuit 24 for energizing control members 15 and 16 of electric valve means 6. The control circuit 24 may be energized from any suitable source of alternating potential and in the accompanying drawing is shown as energized from the constant potential alternating current circuit 4 through any conventional phase shifting device, such as a rotary phase shifter 25 and a transformer 26 preferably of the type designed to furnish a voltage of peaked wave form. A suitable biasing means, such as a battery 27, serves to impress a negative biasing potential upon the control members 15 and 16. A secondary winding of transformer 26 is connected to the control members 15 and 16 of electric valve means 6 through current limiting resistances 28 and conductors 29. A conductor 30 connects the battery 27 to cathode 17.

In order to energize the field winding 3 of dynamo-electric machine 1, I provide a transformer 31 having a secondary winding 32 which is energized from the alternating current circuit 4. One terminal of the field winding 3 is connected to an electrical mid-connection of the secondary winding 32 of transformer 31 by means of a conductor 33, and the other terminal of the field winding 3 is connected to the cathode 17 of electric valve means 6 by means of a conductor 34 and the conductor 23. Terminals of the secondary winding 32 of transformer 31 are connected to the auxiliary anodes 18 and 19 of electric valve means 6 through conductors 35 and 36. In this manner, a direct current is supplied to the field winding 3 of dynamo-electric machine 1. Although in the arrangement of my invention diagrammatically shown in the drawing I have chosen to show my invention as employing a single electric valve means in which the rectifying devices, for the armature member 2 and the field winding 3 are enclosed in one receptacle, it should be understood that I may use separate electric valve means for energizing the armature member 2 and the field winding 3, or that I may use a plurality of electronic discharge devices employing ionizable mediums in which a single anode and a cathode are located in an enclosing receptacle.

The conductivity of the arc discharge paths associated with the auxiliary anodes 18 and 19 of electric valve means 6 is controlled by means of control members 20 and 21, respectively, through a control circuit 37 which serves to control an operating condition, such as the speed, of the dynamo-electric machine 1. The control circuit 37 includes a conventional phase shifting arrangement, such as the rotary phase shifter 38, which may be controlled manually or automatically, and a transformer 39 having a secondary winding 40. The control circuit 37 is shown as being energized from the constant potential alternating current circuit 4. It should be noted, however, that this control circuit may be energized from any suitable source of alternating potential. An electrical mid-connection of the secondary winding 40 of transformer 39 is connected to the cathode 17 of electric valve means 6 through a conductor 41, a suitable negative biasing means, such as a battery 42, and a conductor 43 and the conductor 23. Terminals of the secondary winding 40 of transformer 37 are connected to control members 20 and 21 of electric valve means 6 through current limiting resistors 44 and conductors 45 and 46.

If it is desired to control the dynamo-electric machine 1 by means directly associated with the network 5, suitable controlling or switching means may be employed to control the output circuit 7 of network 5. In the drawing I have diagrammatically shown a switch 47 arranged to short circuit the output circuit 7, thereby providing an additional means for controlling the dynamo-electric machine 1.

While in the drawing I have described my invention as applied to a single phase alternating current supply circuit, it should be understood that my invention may equally well be applied to polyphase alternating current systems and that polyphase means such as networks of the resonating type may be employed to transform polyphase constant potential alternating current to alternating current of constant value.

The general principles of operation of the embodiment of my invention diagrammatically illustrated in the single figure of the drawing may be best explained by considering the electric valve translating system when the dynamo-electric machine is being energized from the constant potential alternating current circuit 4 through the network 5 and the electric valve translating means 6. Let it be assumed that the switch 47 is in the open position and that the network 5 functions to transform constant potential alternating current to alternating current of constant value and that the electric valve means 6 through the principal anodes 13 and 14 and cathode 17 serve to convert the alternating current of constant value to direct current of constant value so that a substantially constant direct current is supplied to the armature member 2 of dynamo-electric machine 1. Let it further be assumed that the transformer 10 and the network 5 are designed so that a suitable value of direct current will be supplied to the armature member 2 with the potentials impressed on the control members 15 and 16 retarded relative to the potentials impressed on the associated anodes 13 and 14. This retardation in phase of the potentials impressed on the control members 15 and 16 may be accomplished by the proper adjustment of the rotary phase shifter 25. The field winding 3 of dynamo-electric machine 1 is energized from the constant potential alternating current circuit 4 through transformer 31, auxiliary anodes 18 and 19 and cathode 17 of the electric valve means 6.

Since the potentials impressed on the control members 15 and 16 are retarded relative to the potentials impressed on the anodes 13 and 14 by secondary winding 12 of transformer 15, it is to be noted that the current supplied to the primary winding 11 of transformer 10 will be a lagging current. Furthermore, due to the operation of the network 5, the current supplied to the network 5 from the constant potential alternating current circuit 4 will be a leading current; that is, the power factor angle of the input and output circuits of the network 5 will be of substantially equal magnitude but of opposite sign.

Under the conditions above described, the network 5 and the electric valve means 6 will supply a substantially constant direct current to the armature member 2 of dynamo-electric machine 1 and the field winding 3 will be energized through the transformer 31 and auxiliary anodes 18 and 19 and cathode 17 of electric valve means 6. If it is desired to control an operating characteristic or condition of the dynamo-electric machine 1, such as the speed of the machine when it is operating as a constant current motor, this control may be effected by controlling the magnitude of the current supplied to the field winding 3. As is well understood by those skilled in the art, when there is substantial phase coincidence between the voltages impressed on the control members 20 and 21 and associated auxiliary anodes 18 and 19, the current supplied to the field winding 3 will be maximum. As the potential impressed on the control members 20 and 21 is retarded in phase relative to the potentials impressed on the auxiliary anodes 18 and 19, it will also be understood that the voltage impressed on the field current and hence the average current will be decreased. At that position where there is substantial phase opposition between the voltages impressed on the control members 20 and 21 and anodes 18 and 19, the current supplied to the field winding 3 will be substantially zero. Therefore by retarding the phase of the potentials impressed on the control members 20 and 21, the torque produced by the machine 1 will be reduced and will effect a reduction in the speed of the machine. Conversely, if the rotary phase shifter 38 is initially adjusted so that the current supplied to the field winding 3 may be increased by advancing the phase of the potentials impressed on the control members 20 and 21, the torque and hence the speed of the machine 1 may be increased by so advancing the rotary phase shifter 38.

Adjustment of the potentials impressed on the control members 15 and 16 relative to the potentials impressed on the associated principal anodes 13 and 14 effects an adjustment in the power factor of the current supplied to the primary winding 11 of transformer 10 by the network 5, but this adjustment does not materially affect the value of the direct current supplied to the armature member 2 of dynamo-electric machine 1. Therefore, this control permits adjustment of the power factor of the current supplied by the constant potential alternating current circuit 4 to the network 5.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit of constant potential, means energized from said alternating current circuit for transforming constant potential alternating current to alternating current of constant value, a dynamo-electric machine, electric valve means interposed between said first-mentioned means and said dynamo-electric machine for supplying direct current of constant value to said machine, and means for controlling said dynamo-electric machine.

2. In combination, an alternating current circuit of constant potential, a network of reactances of opposite sign arranged to be energized from said alternating current circuit for transforming constant potential alternating current to alternating current of constant value, a dynamo-electric machine, electric valve means interposed between said network and said dynamo-electric machine for supplying said machine with direct current of constant value, and means for controlling said dynamo-electric machine.

3. In combination, an alternating current circuit of constant potential, a network of reactances of opposite sign arranged to be energized from said alternating current circuit for transforming constant potential alternating current to alternating current of constant value, a dynamo-electric machine, electric valve means interposed between said network and said dynamo-electric machine for supplying direct current of constant value to said machine, means for controlling a predetermined operating condition of said machine, and means for controlling said electric valve means to control the power factor of the current consumed by said network from said alternating current circuit.

4. In combination, an alternating current circuit of constant potential, a network of reactances of opposite sign arranged to be energized from said alternating current circuit for transforming constant potential alternating current to alternating current of constant value, a dynamo-electric machine having an armature winding and a field winding, electric valve means interposed between said network and said dynamo-electric machine for supplying said armature winding with direct current of constant value, and means for controlling the energization of said field winding to control said dynamo-electric machine.

5. In combination, an alternating current circuit of constant potential, a network of reactances of opposite sign arranged to be energized from said alternating current circuit for transforming constant potential alternating current to alternating current of constant value, a dynamo-electric machine of the direct current type including an armature winding and a field winding, an electric valve means interposed between said network and said dynamo-electric machine for supplying direct current of constant value to said armature winding, electric valve means for energizing said field winding, and means for controlling said second-mentioned electric valve means to control an operating condition of said dynamo-electric machine.

6. In combination, an alternating current circuit of constant potential, a network of reactances of opposite sign arranged to be energized from said alternating current circuit for transforming constant potential alternating current to alternating current of constant value, a dynamo-electric machine including an armature winding and a field winding, electric valve means including arc discharge paths interposed between said network and said dynamo-electric machine for supplying direct current of constant value to said armature winding, electric valve means including arc discharge paths for supplying direct current of variable magnitude to said field winding, and means for controlling said second-mentioned arc discharge paths to effect control of an operating condition of said dynamo-electric machine.

7. In combination, an alternating current circuit of constant potential, a dynamo-electric machine having an armature winding and a field winding, a network of reactances of opposite sign arranged to be energized from said alternating current circuit for transforming constant potential alternating current to alternating current of constant value, electric valve means interposed between said network and said dynamo-electric machine for supplying direct current of constant value to said armature winding, electric valve means including arc discharge paths and control members therefor for energizing said field winding, and means for controlling said second-mentioned electric valve means through said control members to control the speed of said dynamo-electric machine.

8. In combination, an alternating current circuit of constant potential, a network of reactances of opposite sign energized from said alternating current circuit for transforming constant potential alternating current to alternating current of constant value, a dynamo-electric machine having an armature winding, electric valve means including a plurality of arc discharge paths and control members therefor interposed between said network and said dynamo-electric machine for supplying direct current of constant value to said armature winding, and means for energizing said control members to control the conductivity of said arc discharge paths so that said network consumes leading current from said alternating current circuit.

9. In combination, an alternating current circuit of constant potential, a dynamo-electric machine having an armature winding, electric translating apparatus for energizing said dynamo-electric machine from said alternating current circuit comprising a network of reactances of opposite sign for transforming constant potential alternating current to alternating current of constant value, electric valve means including a plurality of arc discharge paths and control members therefor interposed between said network and said dynamo-electric machine for supplying direct current of constant value to said armature winding, and means for energizing said control members so that said valve means consumes lagging current from said network to cause said network to consume leading current from said alternating current circuit.

10. In combination, an alternating current circuit of constant potential, a network of reactances of opposite sign arranged to be energized from said alternating current circuit for transforming constant potential alternating current to alternating current of constant value, a dynamo-electric machine having an armature winding and a field winding, electric valve means including a plurality of arc discharge paths and control members therefor interposed between said network and said machine for supplying direct current of constant value to said armature winding, a second electric valve means for energizing said field winding, means for controlling said first-mentioned electric valve means through said control members to cause said first-mentioned electric valve means to consume leading current from said alternating current circuit, and means for controlling said second-mentioned electric valve means to control an operating condition of said dynamo-electric machine.

11. In combination, an alternating current circuit of constant potential, a dynamo-electric machine having an armature winding and a field winding, means for controlling the energization of said field winding to effect control of an operating condition of said dynamo-electric machine, and means for supplying direct current of constant value to said armature winding independently of said operating condition comprising a network of reactances of opposite sign arranged to be energized from said alternating current circuit for transforming constant potential alternating current to alternating current of constant value and an electric valve means interposed between said network and said dynamo-electric machine.

12. In combination, an alternating current circuit of constant potential, a network of reactances of opposite sign arranged to be energized from said alternating current circuit for transforming constant potential alternating current to alternating current of constant value, said network having an output circuit, a dynamo-electric machine having an armature winding, and electric valve means interposed between said network and said dynamo-electric machine and being energized from said output circuit of said network for supplying direct current of constant value to said armature winding, and means for controlling said output circuit of said network to control said dynamo-electric machine.

13. In combination, an alternating current circuit of constant potential, a network of reactances of opposite sign arranged to be energized from said alternating current circuit for transforming constant potential alternating current to alternating current of constant value, and having an output circuit, a dynamo-electric machine having an armature winding, an electric valve means interposed between said network and said dynamo-electric machine and being energized from said output circuit of said network for supplying direct current of constant value to said armature winding, and means for short circuiting said output circuit to control said dynamo-electric machine.

14. In combination, an alternating current circuit of constant potential, a network of reactances of opposite sign for transforming constant potential alternating current to alternating current of constant value, a dynamo-electric machine of the direct current type having an armature winding and a field winding, means for controlling the energization of said field winding to control the speed of said dynamo-electric machine, and electric valve means having a plurality of arc discharge paths and control members therefor, said electric valve means being interposed between said network and said dynamo-electric machine for supplying direct current of constant value to said armature winding, and means for energizing said control members so that said network consumes leading current from said alternating current circuit independently of the speed of said dynamo-electric machine.

RICHARD TRÖGER.